(12) United States Patent
Kobayashi et al.

(10) Patent No.: US 9,307,751 B2
(45) Date of Patent: Apr. 12, 2016

(54) FISHING REEL

(71) Applicant: Globeride, Inc., Tokyo (JP)

(72) Inventors: Mikiharu Kobayashi, Tokyo (JP);
Hiroshi Toma, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/481,226

(22) Filed: Sep. 9, 2014

(65) Prior Publication Data

US 2015/0090823 A1 Apr. 2, 2015

(30) Foreign Application Priority Data

Sep. 27, 2013 (JP) ................................. 2013-201634

(51) Int. Cl.
*A01K 89/01* (2006.01)
*A01K 89/015* (2006.01)

(52) U.S. Cl.
CPC ..................................... *A01K 89/015* (2013.01)

(58) Field of Classification Search
CPC ............ A01K 89/015; A01K 89/0186; A01K 89/0188; A01K 89/0189
See application file for complete search history.

(56) References Cited

U.S. PATENT DOCUMENTS

| | | | | |
|---|---|---|---|---|
| 5,362,010 A * | 11/1994 | Takamatsu | ........... | A01K 89/015 242/261 |
| 5,904,310 A * | 5/1999 | Miyazaki | ............. | A01K 89/015 192/107 R |
| 6,216,969 B1 * | 4/2001 | Yamaguchi | ........ | A01K 89/0117 242/247 |
| 6,412,719 B1 * | 7/2002 | Hyon | ................... | A01K 89/015 242/257 |
| 7,007,881 B2 * | 3/2006 | Chang | .................. | A01K 89/015 192/107 R |
| 2001/0038052 A1 * | 11/2001 | Oishi | ................... | A01K 89/015 242/255 |
| 2005/0056716 A1 * | 3/2005 | Kawasaki | ............ | A01K 89/015 242/310 |
| 2007/0114314 A1 * | 5/2007 | Bin Ahmad | .......... | A01K 89/033 242/245 |
| 2007/0181728 A1 * | 8/2007 | Kawasaki | .............. | A01K 89/00 242/310 |
| 2012/0067993 A1 * | 3/2012 | Nakagawa | ........... | A01K 89/015 242/257 |
| 2013/0153700 A1 * | 6/2013 | Niitsuma | .............. | A01K 89/015 242/310 |

FOREIGN PATENT DOCUMENTS

JP    2011-004681    1/2011

* cited by examiner

*Primary Examiner* — Emmanuel M Marcelo
(74) *Attorney, Agent, or Firm* — Pillsbury Winthrop Shaw Pittman, LLP (57) ABSTRACT

One object is to maintain the moving performance of a power transmission member for a long period and maintain excellent operation of a clutch mechanism. In accordance with one aspect, the clutch mechanism includes a power transmission member supported by a bearing so as to be rotatable and movable in an axial direction of the spool shaft, the power transmission member being switched between a line-winding state wherein the power transmission member is moved toward the spool and transmits a rotational drive force from the handle to the spool shaft and a free-spool state wherein the power transmission member is moved opposite to the spool and shuts off the rotational drive force.

3 Claims, 6 Drawing Sheets

Left ←                                    → Right

FISHING REEL

CROSS-REFERENCE TO RELATED APPLICATIONS

This application is based on and claims the benefit of priority from Japanese Patent Application Serial No. 2013-201634 (filed on Sep. 27, 2013), the contents of which are hereby incorporated by reference in their entirety,

TECHNICAL FIELD

The invention relates to a fishing reel.

BACKGROUND

Conventionally, there are known fishing reels having a spool rotatably supported between side plates of a reel body, and a clutch mechanism for switching the spool between a line-winding state and a free-spool state (see, e.g., Japanese Patent Application Publication No. 2011-4681). The clutch mechanism includes a drive force transmission route for transmitting a drive force from a handle. The drive force transmission route contains a power transmission member operable in conjunction with the rotational operation of the handle or the operation of a switching member, so as to switch the clutch between On and Off states.

The power transmission member is supported so as to be rotatable and movable in the axial direction of the spool shaft and is configured to move back and forth with respect to the engaging projection of the spool shaft upon switch of the clutch between On and Off states. As the power transmission member moves back and forth, the engaging projections are engaged with and disengaged from a recess, so as to turn on and off the transmission of the drive force.

The power transmission member is supported with the outer circumferential surface thereof contacting the inner circumferential surface of a bearing whether the clutch is in On state or Off state. When the clutch is switched (returned) from Off state to On state, there is possibility that foreign substances enter and stick between the bearing and the power transmission member. Such foreign substances include grains of salt included in the seawater entering the reel and grit and dust entering the reel. Such sticking of foreign substances may reduce the moving performance of the power transmission member and affect the operation of the clutch.

SUMMARY

The present invention is intended to overcome the above problem; and one object of the present invention is to provide a fishing reel that can maintain the moving performance of the power transmission member for a long period and maintain excellent operation of the clutch mechanism.

The fishing reel of the present invention overcoming the above problem comprises: a reel body, a handle provided on the reel body; a spool rotatably supported by the reel body via a spool shaft; and a clutch mechanism including a power transmission member supported by the reel body via a bearing so as to be rotatable and movable in an axial direction of the spool shaft, the power transmission member being switched between a line-winding state wherein the power transmission member is moved toward the spool in such a manner as to transmit a rotational drive force from the handle to the spool shaft and a free-spool state wherein the power transmission member is moved opposite to the spool in such a manner as to shut off the rotational drive force, wherein an outer circumferential portion of the power transmission member includes a large-diameter portion and a small-diameter portion formed adjacent to the large-diameter portion and extending toward the spool, and wherein, in the line-winding state, the large-diameter portion is fitted in the bearing and rotatably supported by an inner circumferential surface of the bearing; and in the free-spool state, the power transmission member is moved laterally such that at least part of the large-diameter portion and the small-diameter portion is exposed outside of the bearing.

This fishing reel may have support structure wherein, in the free-spool state, the power transmission member is fitted (inserted) into the bearing so as to have a radial clearance with the inner circumferential surface of the bearing. Accordingly, even if, when the clutch mechanism is switched (returned) from Off state to On state, a foreign substance such as grains out of seawater is present on the outer circumferential surface of the power transmission member, the foreign substance can be moved to between the inner circumferential surface of the bearing and the outer circumferential surface of a small-diameter portion. Thus, a foreign substance can be surely prevented from entering and sticking between the inner circumferential surface of the bearing and the outer circumferential surface of a large-diameter portion.

The inner circumferential surface of the bearing may preferably be provided with a resin collar. This may allow the power transmission member to slide smoothly when the clutch mechanism is switched (returned) from Off state to On state.

In the present invention, even if, when the clutch mechanism is switched (returned) from Off state to On state, a foreign substance such as grains out of seawater is present on the outer circumferential surface of the power transmission member, it is possible to surely prevent insufficient return of the clutch mechanism caused by the sticking foreign substance, because of the fitting support structure with a clearance between the power transmission member and the bearing. Accordingly, the present invention is capable of maintaining the moving performance of the power transmission member for a long period and maintaining excellent operation of the clutch mechanism. Thus, excellent operability of the clutch can be maintained even in a fishing site having a harsh environment.

Further, a resin collar provided on the inner circumferential surface of the bearing allows the power transmission member to slide smoothly when the clutch mechanism is switched (returned) from Off state to On state. Therefore, the present invention is capable of maintaining the moving performance of the power transmission member for a long period and maintaining excellent operation of the clutch mechanism.

BRIEF DESCRIPTION OF THE DRAWINGS

FIGS. 6a and 6b show main portions of a variation, wherein

DESCRIPTION OF EXAMPLE EMBODIMENTS

Embodiments of a fishing reel according to the present invention will now be described with reference to the drawings. In the following description, the directions referred to as "front and rear" and "left and right" are based on those shown in FIG. 1. The same elements are denoted with the same numeral and free of duplicate description.

Figure 1:
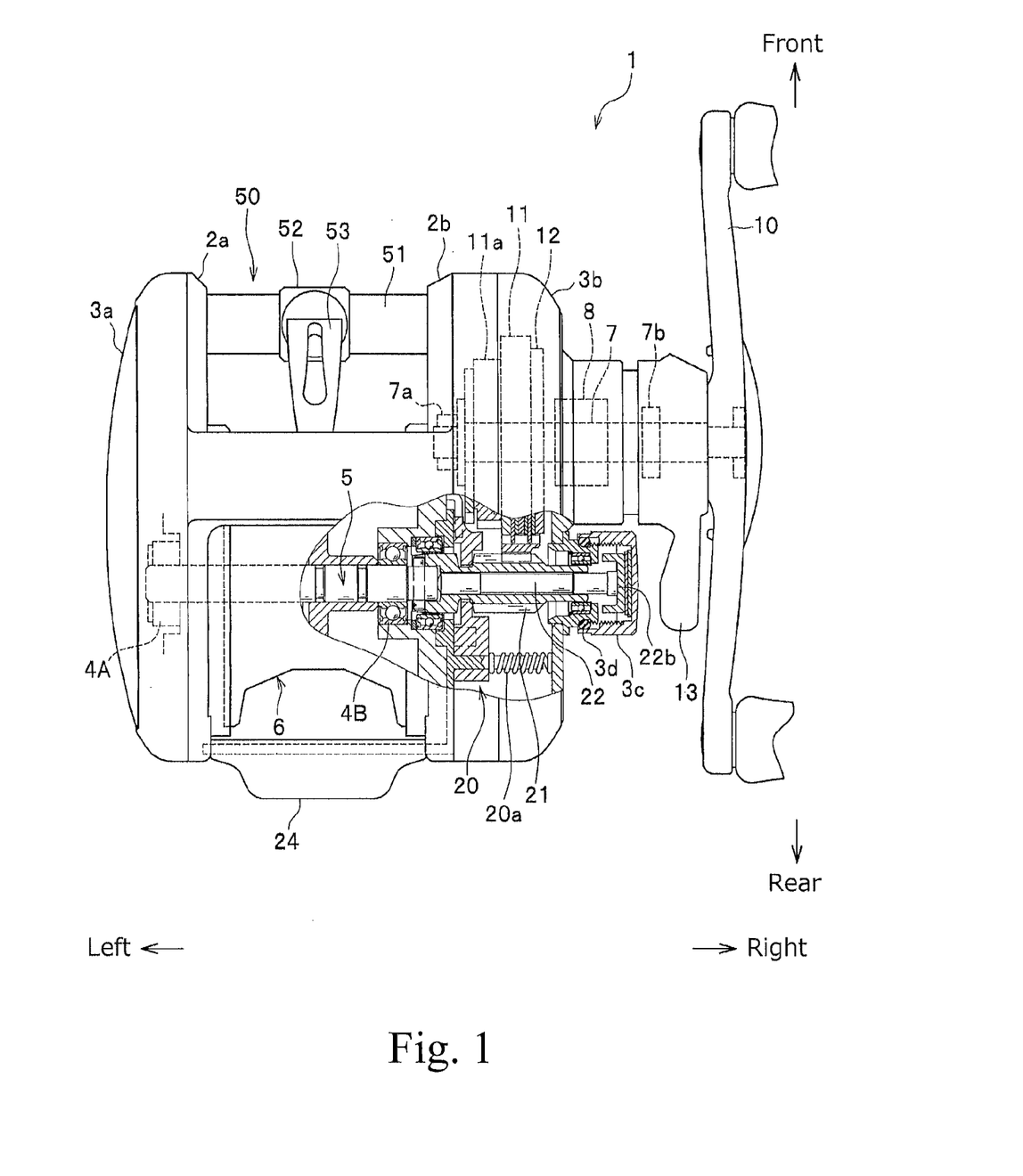
FIG. 1 is a partially sectional plan view of a double bearing reel as a fishing reel according to an embodiment of the present invention.

As shown in FIG. 1, the reel body 1 of a double-bearing reel may include a left frame 2a and a left side plate 3a mounted on the left frame 2a via a sealing material with a predetermined space therebetween, and a right frame 2b and a right side plate 3b mounted on the right frame 2b in the same manner as the left side plate 3a. The left frame 2a and the right frame 2b may be integrated with each other via a plurality of beams and may be mounted on a reel seat (not shown) of a fishing rod via a reel leg mounted on lower beams.

Between the left and right side panels 2a, 2b (the left and right frames 3a, 3b), a spool shaft 5 may be rotatably supported via bearings 4A, 4B. The spool shaft 5 may carry a spool 6 around which a fishing line is to be wound. The spool 6 may be configured so as to be rotatable in accordance with rotational operation of the handle 10, which may be mounted on an end of a handle shaft 7 projecting from the right side plate 3b.

The handle shaft 7 may be rotatably supported between the right frame 2b and the right side plate 3b via the bearings 7a, 7b and may be configured to be rotatable only in the direction of winding the line by a one-way clutch 8 disposed between the handle shaft 7 and the right side plate 3b.

Between the right frame 2b and the right side plate 3b may be provided a drive gear 11 rotatably supported by the handle shaft 7 and configured to transmit the rotational movement of the handle 10 to the spool shaft 5, and a publicly known drag mechanism 12 in engagement with the drive gear 11 and configured to impart a predetermined drag force to the spool 6. The drag mechanism 12 may include a plurality of friction plates contacting the drive gear 11 and may be configured to impart a predetermined drag force to the spool 6 when a line is released from the spool 6 for fishing. Such a drag mechanism 12 may be configured such that the operation member 13 disposed on an edge of the handle shaft 7 can be rotationally operated to adjust the pressing force on the drive gear 11 and thus adjust the drag force on the spool 6.

Figure 2A:
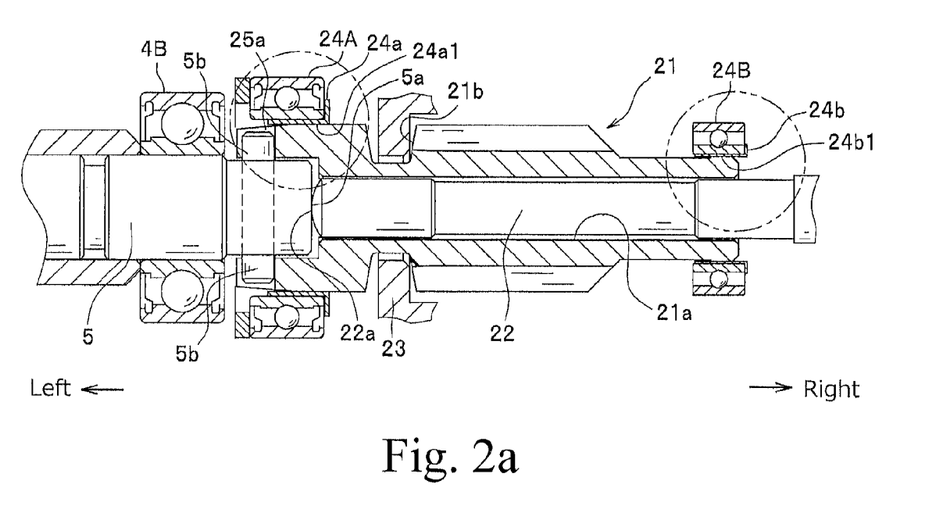
FIG. 2a is a sectional view showing an expanded pinion portion under clutch-On state.

The drive gear 11 may mesh with a pinion 21 as a power transmission member included in the clutch mechanism 20. The pinion 21 may transmit rotation of the drive gear 11 to the spool 6 (spool shaft 5) and, as shown in FIG. 2a, the pinion 21 may have a center hole 21a that extends axially therethrough. The center hole 21a may be penetrated by a support shaft 22. The left end surface 22a of the support shaft 22 may contact the end surface 5a of the spool shaft 5 and, as shown in FIG. 1, the right end surface 22b of the support shaft 22 may contact the inner surface of a shaft-covering member 3c screwed into the right side plate 3b. Thus, the support shaft 22 may be restricted from moving in the axial direction. Further, as the shaft-covering member 3c is rotationally operated, the support shaft 22 may impart a pressing force as a brake force to the spool shaft 5. The shaft-covering member 3c may be mounted via a sealing material 3d; alternatively, the shaft-covering member 3c may also be mounted via a click mechanism that provides click feeling in rotational operation, instead of the sealing material 3d It may also be possible that the spool shaft 5 extend toward the right side plate 3b to penetrate the center hole 21a of the pinion 21 such that the end surface of the spool shaft 5 contacts the inner surface of the shaft-covering member 3c. This arrangement may be free of the support shaft 22.

As shown in FIG. 2a, the pinion 21 may partially have a circumferential groove 21b along the circumferential direction, and the circumferential groove 21b may be engaged with a clutch member 23. As shown in FIG. 1, when the clutch operation member 24 is operated downward (for switch from clutch-On state to clutch-Off state), the clutch member 23 may be driven rightward in the figure, against the urging force by the urging member 20a. This may cause the pinion 21 to move rightward along the support shaft 22.

As shown in FIG. 2a, the pinion 21 may be rotatably supported at both ends thereof by the left bearing 24A and the right bearing 24B provided on the reel body (the right frame 2b and the right side plate 3b, see FIG. 1), and may contact the bearings so as to be movable in the axial direction. In an inner ring of the left bearing 24A may be fitted a resin collar 24a for preventing electrolytic corrosion; and the inner circumferential surface 24a1 of the collar 24a may be contacted by the outer circumference of the left edge of the pinion 21. In an inner ring of the right bearing 24B may be fitted a resin collar 24b for preventing electrolytic corrosion; and the inner circumferential surface 24b1 of the collar 24b may be contacted by the outer circumference of the right edge of the pinion 21. The outer circumferential portions of the pinion 21 will be described later.

Figure 3A:
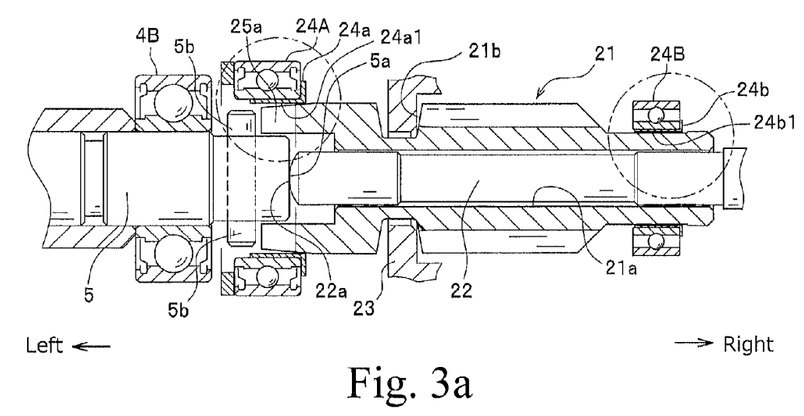
FIG. 3a is a sectional view showing an expanded pinion portion under clutch-Off state.

The pinion 21 may be provided at the left end thereof with a recess 25a that can be engaged with and disengaged from engaging projections 5b, 5b as clutch engagement sections provided on the right edge of the spool shaft 5. In the clutch-On state (winding state) as shown in FIG. 2a, the engaging projections 5b, 5b of the spool shaft 5 may be engaged with the recess 25a; and in the clutch-Off state (free-spool state) as shown in FIG. 3a, the pinion 21 is moved to the right in the figure and the engaging projections 5b, 5b may be disengaged from the recess 25a.

The pinion 21 can be automatically returned from the clutch-Off state to the clutch-On state via a publicly known return mechanism by manual return operation on the clutch operation member 24 (see FIG. 1) or by winding operation on the handle 10.

The right edge of the spool shaft 5 may be fitted in and supported by the bearing 4B mounted on the right frame 2b. The bearing 4B may be a ball bearing.

As shown in FIG. 1, other elements of the reel body 1 may include a level wind device 50 disposed between the left frame 2a and the right frame 2b. The level wind device SO may include a guide tube 51, a worm shaft (now shown) rotatably supported in the guide tube 51, an engaging member 52 for engaging with the worm shaft, and a line guide 53 attached on the engaging member 52. The worm shaft may be rotationally driven by a gear 11a that rotates integrally with a drive gear 11 via a gear not shown.

Figure 2B:
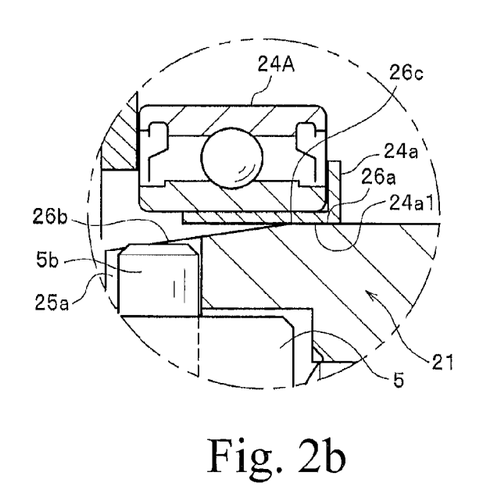
FIGS. 2b and 2c are expanded sectional views showing fitting on the bearings.

As shown in FIG. 2b, the outer circumferential portion of the left edge of the pinion 21 may include a left large-diameter portion 26a as a large-diameter portion and a sloped portion 26b as a small-diameter portion. The left large-diameter portion 26a may contact the inner circumferential surface 24a1 of the collar 24a in the left bearing 24A and may be supported by the inner circumferential surface 24a1 with an appropriate clearance so as to be movable in the axial direction. The sloped portion 26b may have a smaller diameter than the left large-diameter portion 26a and may be continuous with the left large-diameter portion 26a at the border 26c and extend leftwards (toward the spool 6). The sloped portion 26b may have a tapered surface tapered leftward (toward the spool 6) (a surface sloped toward the central axis of the pinion 21).

Figure 3B:
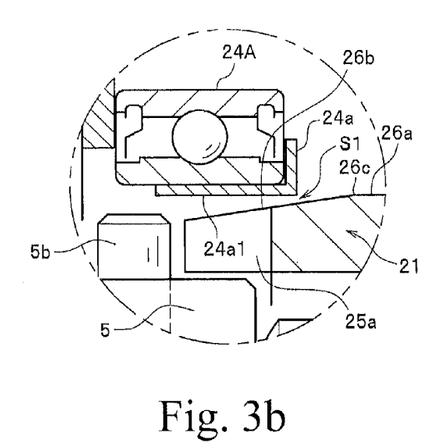
FIGS. 3b and 3c are expanded sectional views showing fitting on the bearings.

In the clutch-On state as shown in FIG. 2b, the left large-diameter portion 26a may be positioned inside the left bearing 24A and contact the inner circumferential surface 24a1 of the collar 24a so as to be fitted in and supported by the left bearing 24A. In the clutch-Off state as shown in FIG. 3b, the left large-diameter portion 26a may be moved rightward and outside of the left bearing 24A so as to be spaced from the inner circumferential surface 24a1 of the collar 24a. Simultaneously, the border 26c may also be positioned outside of the left bearing 24A, and the sloped portion 26b may be partially exposed on the right of the left bearing 24A. The inner circumferential surface 24a1 of the collar 24a may be opposed to the sloped surface of the sloped portion 26b; and between the inner circumferential surface 24a1 and the outer circumferential surface of the sloped portion 26b may be formed a gap S1.

The outer circumferential portion of the right edge of the pinion 21 may include a right large-diameter portion 27a as a large-diameter portion and a right small-diameter portion 27b as a small-diameter portion. The right large-diameter portion 27a may contact the inner circumferential surface 24b1 of the collar 24b in the right bearing 24B and may be supported by the inner circumferential surface 24b1 with an appropriate clearance so as to be movable in the axial direction. The right small-diameter portion 27b may have a smaller diameter than the right large-diameter portion 27a and may be continuous with the right small-diameter portion 27b at the border 27c and extend leftwards (toward the spool 6). The corner at the border 27c may be chamfered or rounded as necessary.

Figure 2C:
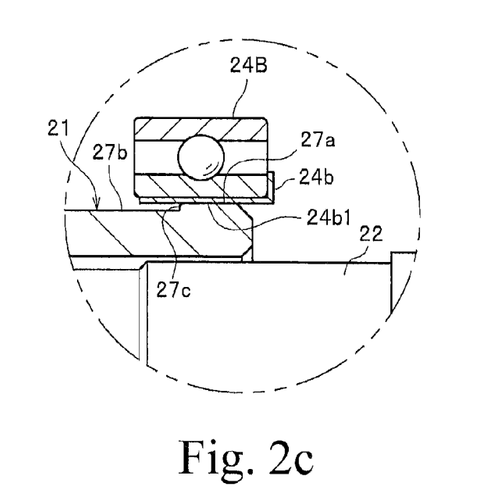
Figure 3C:
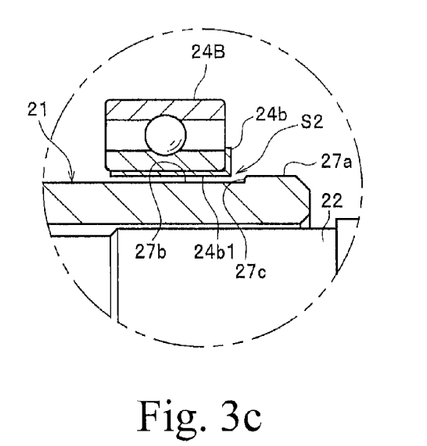

In the clutch-On state as shown in FIG. 2c, the right large-diameter portion 27a may be positioned inside the right bearing 24B and contact the inner circumferential surface 24b1 of the collar 24b so as to be supported by the right bearing 24B, In the clutch-Off state as shown in FIG. 3c, the right large-diameter portion 27a may be moved rightward and outside of the right bearing 24B so as to be spaced from the inner circumferential surface 24b1 of the collar 24b. Simultaneously, the border 27c may also be positioned outside of the right bearing 24B, and the right small-diameter portion 27b may be partially exposed on the right of the right bearing 24B. The inner circumferential surface 24b1 of the collar 24b may be opposed to the outer circumferential surface of the right small-diameter portion 27b at a distance; and between the inner circumferential surface 24b1 and the outer circumferential surface of the right small-diameter portion 27b may be formed a gap S2.

In such a double bearing reel, rotational movement produced by the rotational operation of the handle 10 may be transmitted from the handle shaft 7 through the drag mechanism 12 to the drive gear 11 and the gear 11a and then transmitted to the worm shaft for rotation thereof. As the worm shaft is rotated, the engaging member 52 of the level wind device 50 may slide to the left and right; and thus the line may be evenly wound around the spool 6 via the line guide 53 of the engaging member 52.

The left frame 2a may be provided with a publicly known backlash prevention device, which may impart a braking force to overspeed of the spool 6 releasing the line to regulate the speed.

The rotational drive force produced by the rotational operation of the handle 10 and transmitted to the drive gear 11 may be further transmitted to the pinion 21 and then to the spool shaft 5 through the engaging projections 5b, 5b engaged with the recess 25a of the pinion 21 (see FIG. 2a). Thus, the spool 6 may be rotationally driven.

As shown in FIG. 3a, when the clutch operation member 24 is operated (from the clutch-On state to the clutch-Off state), the pinion 21 may be driven rightward in the figure against the urging force by the urging member 20a (see FIG. 1). Thus, the engaging projections 5b, 5b of the spool shaft 5 may be disengaged from the recess 25a of the pinion 21, such that the spool 6 may become free to rotate.

In the clutch-Off state as shown in FIG. 3b, the left large-diameter portion 26a may be moved rightward and outside of the left bearing 24A; and between the inner circumferential surface 24a1 of the collar 24a and the outer circumferential surface of the sloped portion 26b may be formed a gap S1 (the gap S1 may be opened). That is, the left edge of the pinion 21 may be fitted in the left bearing 24A with a radial clearance of the gap S1 between the outer circumference of the left edge of the pinion 21 and the inner circumferential surface 24a1 of the collar 24a of the left bearing 24A. The gap between the inner circumferential surface 24a1 and the smallest-diameter portion of the sloped portion 26b may have a desirable width which may preferably be, e.g., 0.05 to 0.2 mm (the clearance is slightly enlarged for emphasis in FIGS. 2b and 3b). Meanwhile, as shown in FIG. 3c, the right large-diameter portion 27a may be moved rightward and outside of the right bearing 24B; and between the inner circumferential surface 24b1 of the collar 24b and the outer circumferential surface of the right small-diameter portion 27b may be formed a gap S2 (the gap S2 may be opened). That is, the right edge of the pinion 21 may be fitted in the right bearing 24B with a radial clearance of the gap S2 between the outer circumference of the right edge of the pinion 21 and the inner circumferential surface 24b1 of the collar 24b of the right bearing 24B. The gap between the inner circumferential surface 24b1 and the smallest-diameter portion of the right small-diameter portion 27b may also have a desirable width (the height of the step between the right large diameter portion 27a and the right small-diameter portion 27b) which may preferably be, e.g., 0.05 to 0.2 mm.

Then, again when the handle 10 is rotationally operated or the clutch operation member 24 is operated, the clutch mechanism 20 may be returned from the clutch-Off state to the clutch-On state, and the pinion 21 may be moved toward the spool shaft 5 by the urging force of the urging member 20a. Thus, the engaging projections 5b, 5b of the spool shaft 5 may be contacted by the end surface of the pinion 21 rotating, and the engaging projections 5b, 5b of the spool shaft 5 may be fitted into and engaged with the recess 25a of the pinion 21 (see FIG. 2a). Accordingly, the rotational drive force of the handle 10 may be transmitted through the pinion 21 to the spool shaft 5.

Figure 4A:
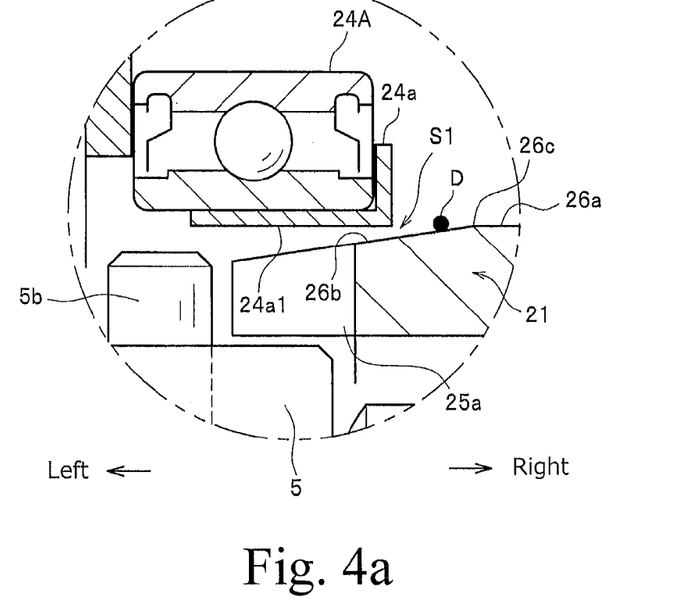
FIGS. 4a and 4b show operation of the left bearing.
Figure 4B:
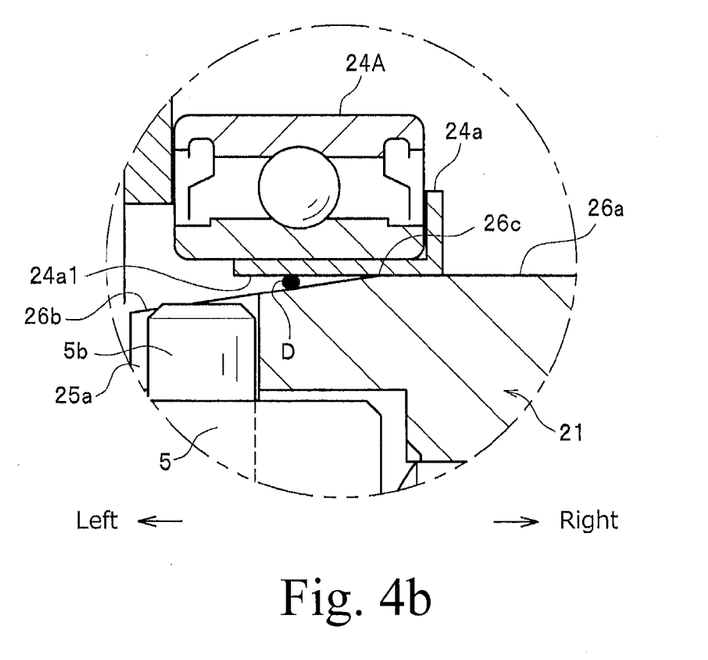
Figure 5A:
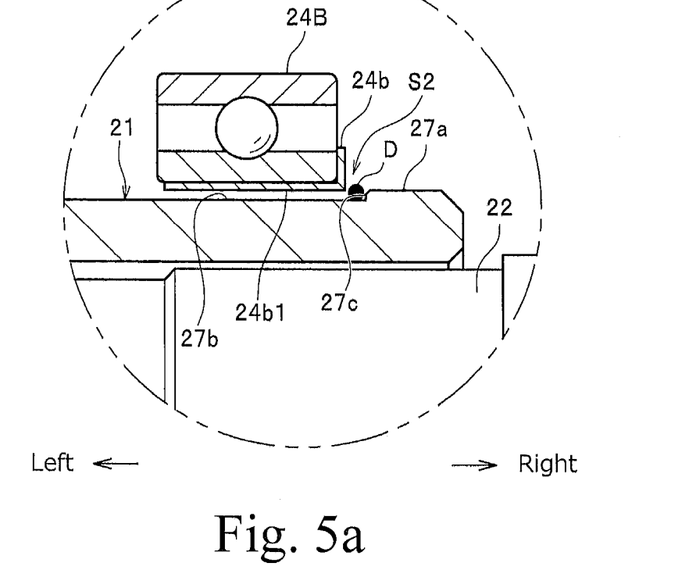
FIGS. 5a and 5b show operation of the right bearing.

If, during such a switch (return) from the clutch-Off state to the clutch-On state, a foreign substance D such as salt grains adheres on the pinion 21 as shown in FIGS. 4a and 5a, the foreign substance D may stick between the left bearing 24A and the pinion 21 or between the right bearing 24B and the pinion 21. It has been described that, in this embodiment, the pinion 21 may be fitted in and supported by the left bearing 24A and the right bearing 24B while being spaced with a radial clearance from the inner circumferential surface 24a1 of the left bearing 24A and the inner circumferential surface 24b1 of the right bearing 24B. This may result in the following advantageous effect. Specifically, even if a foreign substance D is present on the sloped portion 26 as shown in FIG. 4a, the foreign substance D may be moved, as the pinion 21 is moved leftward, into the gap S1 to inside the left bearing 24A (between the inner circumferential surface 24a1 of the collar 24a and the outer circumferential surface of the sloped portion 26b) (see FIG. 4b). That is, the clearance of the gap S1 may allow the foreign substance D to suitably enter between the inner circumferential surface 24a1 of the collar 24a and the outer circumferential surface of the sloped portion 26b, so as to surely prevent the foreign substance D from entering and sticking between the inner circumferential surface 24a1 of the collar 24a and the left large-diameter portion 26a.

Figure 5B:
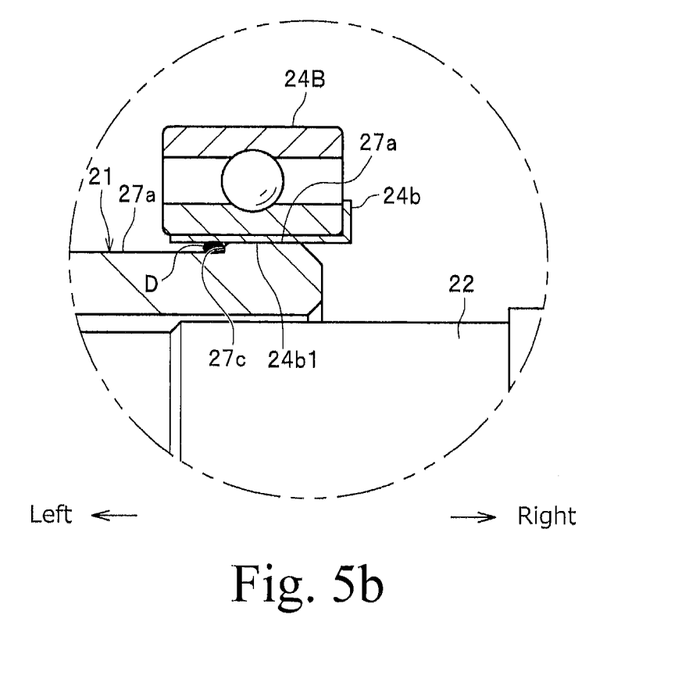

Further, as shown in FIG. 5a, even if a foreign substance D (prone to adhere between the edge of the inner circumferential surface of the right bearing 24B and the fitted portion of the outer circumferential surface of the pinion 21) is present on the right small-diameter portion 27b, the foreign substance D may be naturally moved, as the pinion 21 is moved leftward, into the gap S2 to inside the right bearing 24B (between the inner circumferential surface 24b1 of the collar 24b and the outer circumferential surface of the right small-diameter portion 27b) (see FIG. 5b). That is, the clearance of the gap S2 may prevent sticking of the foreign substance D, prone to adhere between the edge of the inner circumferential surface 24b1 of the collar 24b and the outer circumferential surface of the right small-diameter portion 27b, upon return of the pinion 21.

In the double-bearing reel described above, even if a foreign substance D such as grains out of seawater is present on the outer circumferential surface of the pinion 21 during a switch (return) from the clutch-Off state to the clutch-On state, it is possible to surely prevent insufficient return of the clutch mechanism (wherein the pinion 21 fails to be returned and prohibits a switch from the clutch-Off state to the clutch-On state) caused by the sticking foreign substance D, because of the fitting support structure with a clearance between the pinion 21 and the bearings (the left bearing 24A and the right bearing 24B). Thus, excellent operability of the clutch can be maintained even in a fishing site having a harsh environment.

Further, the resin collars 24a, 24b fitted into the inner circumference of the left bearing 24A and the inner circumference of the right bearing 24B may allow the pinion 21 to slide smoothly during a switch (return) from the clutch-Off state to the clutch-On state. Accordingly, the moving performance of the pinion 21 can be maintained for a long period, and thus excellent operation of the clutch mechanism can be maintained. Further, since the sloped portion 26b as a small-diameter portion at the left edge of the pinion 21 is tapered with a decreasing diameter from the left large-diameter portion 26a toward the spool 6, the pinion 21 can slide smoothly during a switch (return) from the clutch-Off state to the clutch-On state.

As described above, if the shaft-covering member 3c is mounted via a click mechanism instead of a sealing material 3d, it is more likely that a foreign substance enter the reel than with the sealing material 3d; therefore, the fitting structure with a clearance as in the embodiment is effective.

In the above embodiment, the ends of the pinion 21 may be formed in a tapered or stepped form; but the shapes of the pinion 21 fitted into the left bearing 24A and the right bearing 24B are not limited thereto.

Figure 6A:
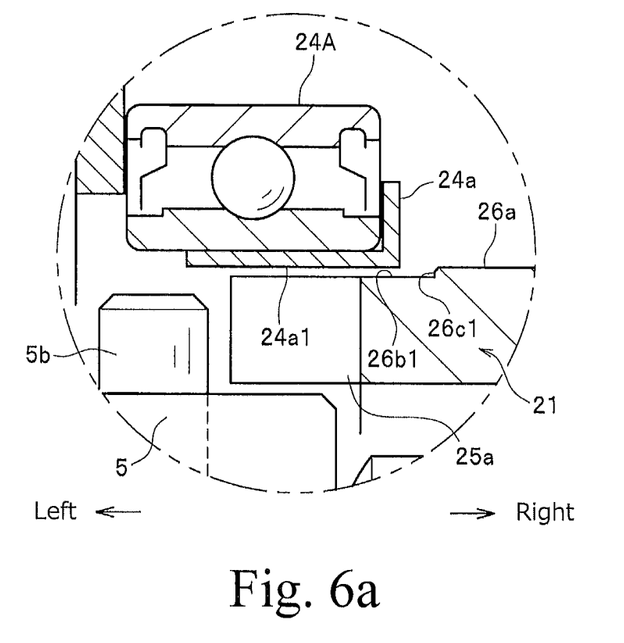
FIG. 6a shows fitting on the left bearing under clutch-Off state.
Figure 6B:
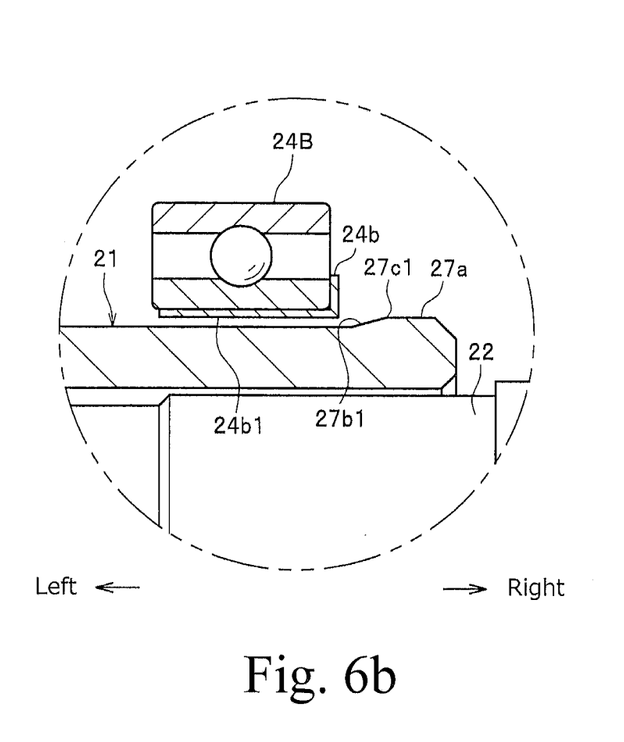
FIG. 6b shows fitting on the right bearing under clutch-Off state.

In the above embodiment, the left edge of the pinion 21 may include the left large-diameter portion 26a and the sloped portion 26b, and the right edge of the pinion 21 may include the right large-diameter portion 27a and the right small-diameter portion 27b; but the shapes of the left and right edges are not limited thereto and may be interchanged. That is, as shown in FIG. 6a, the left edge may include a left large-diameter portion 26a and a left small-diameter portion 26b1 which may be continuous with the left large-diameter portion 26a at the stepped border 26c1 and extend leftwards (toward the spool 6); and as shown in FIG. 6b, the right edge may include a right large-diameter portion 27a and a sloped portion 27b1 as a small-diameter portion which may be continuous with the right large-diameter portion 27a at the border 27c1 and extend leftwards (toward the spool 6). This arrangement also produces the same effect as the above embodiment.

Further, the left and right ends of the pinion 21 may be sloped portions 26b and 27b1, respectively; or the left and right ends of the pinion 21 may be left small-diameter portions 26b1 and 27b, respectively.

Further, the inner rings of the left bearing 24A and the right bearing 24B may directly support the pinion 21 without use of collars 24a, 24b.

Although it is most desirable to apply the embodiment to the regions at both ends of the pinion 21 supported by the bearings, it is also possible to apply the embodiment to either one of the ends, e.g., the drive region at the end opposite to the spool 6 (the right large-diameter portion 27a and the right small-diameter portion 27b), because the left and right ends may have different waterproof qualities depending on the inner drive mechanism of the reel It is preferable to make the bearings highly corrosion resistant by applying a high corrosion resistant process such as an electrolytic chromic acid process or a plating process (electroless nickel) to the outer and inner rings of the left bearing 24A and the right bearing 24B or using a high corrosion resistant material (high corrosion resistant martensite-based stainless steel). High corrosion resistant bearings may be rustproof and less likely to draw in a foreign substance D such as grains out of seawater, thus further maintaining the performance of the clutch mechanism.

What is claimed is:

1. A fishing reel comprising:
   a reel body;
   a handle provided on the reel body;
   a spool rotatably supported by the reel body via a spool shaft; and
   a clutch mechanism supported by the reel body via a bearing so as to be rotatable and movable in an axial direction of the spool shaft, the clutch mechanism including a power transmission member, the power transmission member being switched between a line-winding state wherein the power transmission member is moved toward the spool in such a manner as to transmit a rotational drive force from the handle to the spool shaft and a free-spool state wherein the power transmission member is moved opposite to the spool in such a manner as to shut off the rotational drive force,
   wherein an outer circumferential portion of the power transmission member includes a large-diameter portion and a small-diameter portion, the small-diameter portion being formed adjacent to the large-diameter portion and extending toward the spool,
   wherein, in the line-winding state, the large-diameter portion is fitted in the bearing and rotatably supported by an inner circumferential surface of the bearing, and
   wherein in the free-spool state, the power transmission member is moved laterally such that at least part of the large-diameter portion and at least part of the small-diameter portion is exposed outside of the bearing so that the large-diameter portion and the small-diameter portion are away from the inner circumferential surface of the bearing to form a gap therebetween.

2. The fishing reel of claim 1 wherein a resin collar is mounted on the inner circumferential surface of the bearing.

3. A fishing reel comprising:
- a reel body;
- a handle provided on the reel body;
- a spool rotatably supported by the reel body via a spool shaft;
- a clutch mechanism supported by the reel body via a bearing so as to be rotatable and movable in an axial direction of the spool shaft, the clutch mechanism including a power transmission member, the power transmission member being switched between a line-winding state wherein the power transmission member is moved toward the spool in such a manner as to transmit a rotational drive force from the handle to the spool shaft and a free-spool state wherein the power transmission member is moved opposite to the spool in such a manner as to shut off the rotational drive force; and
- the power transmission member having an outer circumferential portion that includes a large-diameter portion and a small-diameter portion, the small-diameter portion being formed adjacent to the large-diameter portion and extending toward the spool,
- wherein, in the line-winding state, the large-diameter portion is fitted in the bearing and rotatably supported by an inner circumferential surface of the bearing having a mounted resin collar, and
- wherein in the free-spool state, the power transmission member is moved laterally such that at least part of the large-diameter portion and the small-diameter portion is exposed outside of the bearing.

* * * * *